(12) United States Patent
Ghazaleh

(10) Patent No.: US 7,516,120 B2
(45) Date of Patent: Apr. 7, 2009

(54) DECISION SUPPORT IMPLEMENTATION FOR WORKFLOW APPLICATIONS

(75) Inventor: David Abu Ghazaleh, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 10/898,040

(22) Filed: Jul. 23, 2004

(65) Prior Publication Data

US 2006/0031194 A1 Feb. 9, 2006

(51) Int. Cl.
*G06F 17/30* (2006.01)
(52) U.S. Cl. .............. 707/3; 707/5; 707/6; 707/10
(58) Field of Classification Search ............... 707/3, 707/10, 102, 104.1
See application file for complete search history.

(56) References Cited

U.S. PATENT DOCUMENTS

| 5,913,214 | A  | * | 6/1999  | Madnick et al. | 707/10    |
|-----------|----|---|---------|----------------|-----------|
| 6,173,284 | B1 | * | 1/2001  | Brown          | 707/10    |
| 6,304,967 | B1 | * | 10/2001 | Braddy         | 713/150   |
| 6,405,215 | B1 | * | 6/2002  | Yaung          | 707/104.1 |
| 6,484,149 | B1 | * | 11/2002 | Jammes et al.  | 705/26    |
| 6,567,783 | B1 |   | 5/2003  | Notani et al.  | 705/9     |
| 6,697,783 | B1 |   | 2/2004  | Brinkman et al.| 705/3     |
| 2001/0032205 | A1 | * | 10/2001 | Kubaitis     | 707/10    |
| 2002/0069210 | A1 | * | 6/2002  | Navani et al.| 707/104.1 |
| 2002/0143943 | A1 | * | 10/2002 | Lee et al.   | 709/225   |
| 2003/0009489 | A1 | * | 1/2003  | Griffin      | 707/500   |
| 2003/0195762 | A1 |   | 10/2003 | Gleason et al.| 705/1    |
| 2003/0233372 | A1 | * | 12/2003 | Warner et al.| 707/104.1 |
| 2004/0078373 | A1 | * | 4/2004  | Ghoneimy et al.| 707/10  |

FOREIGN PATENT DOCUMENTS

WO    WO 02/29682    4/2002

* cited by examiner

*Primary Examiner*—Cam Y T Truong
(74) *Attorney, Agent, or Firm*—Yee & Associates, P.C.; Bruce Clay

(57) ABSTRACT

The invention comprises a new and useful process, and appurtenant apparatus, for developing and using workflow applications with decision support. Specifically, the invention includes a decision support engine and a programmatic interface thereto. The decision support engine is a middleware computer program that receives queries from a workflow application, connects to external data sources, executes queries, and returns query results to the workflow application. The programmatic interface allows a developer to integrate business logic and queries into a workflow application that supports decision-making.

1 Claim, 3 Drawing Sheets

DECISION SUPPORT IMPLEMENTATION FOR WORKFLOW APPLICATIONS

FIELD OF THE INVENTION

The invention generally relates to tools and techniques for developing computer programs. Particularly, the invention relates to tools and techniques for developing workflow applications that provide decision support for the end-user.

BACKGROUND OF THE INVENTION

A "workflow" is a familiar concept to many people. Generally, a "workflow" is any series of steps or activities necessary for completing a particular task. A "workflow process" is any set of related activities that the workflow application treats as a single unit of activity. For example, the process of obtaining permanent resident status (a "green card") for an alien employee could be described as a workflow. To obtain a green card, someone must file a labor certification with the Department of Labor. The Department of Labor then must process the certification, first at the state level and then at the national level. If the Department of Labor approves the certification, someone must file a second application with the Immigration and Naturalization Service (INS), which then investigates and approves or rejects the application. Of course, each of the filing and processing activities are themselves comprised of smaller tasks and activities, but in this example, each of the filing and processing activities probably would be treated as a workflow process.

A "workflow application" is any computer program designed to coordinate or manage a workflow, particularly in an enterprise setting. Thus, in the above example, a workflow application could coordinate the workflow processes (the filing and processing activities) among the filer, the Department of Labor, and the INS.

Workflow applications are common. Many workflow applications are highly specialized for a specific industry, such as the medical application disclosed in U.S. Pat. No. 6,697,783 (issued Feb. 24, 2004). Other such systems, though, have been designed to accommodate more generalized needs, including the system disclosed in U.S. Pat. No. 6,567,783 (issued May 20, 2003).

Decision support systems also are common in the enterprise world. In general, a decision support system is any means for gathering information from one or more sources, analyzing the information, and predicting the impact of a decision before it is made. A decision support system frequently is implemented as a computer program, and just as frequently is integrated with other types of programs to create a more comprehensive application. U.S. Pat. No. 6,697,783, U.S. Pat. No. 6,567,783, U.S. Patent App. No. 2003/0195762 (published Oct. 16, 2003), and WO 2002/29682 (published Apr. 11, 2004), for example, all disclose a workflow application with some form of integrated decision support system.

Tools for developing workflow applications and decision support systems probably are as common as the applications themselves. Again, though, many of these tools are specialized for a specific industry or type of application. WO 2002/29682, for example, discloses a tool for developing an automated loan processing system to meet the needs of an individual enterprise. Other tools, though, have attempted to generalize the development process, such as the tools described in U.S. Pat. No. 6,567,783 and U.S. Patent App. No. 2003/0195762.

Thus, neither the concept of a "workflow" nor a "decision support system" is new. Nor is the use of a computer to implement a workflow process or a decision support system new. The structure and organization of such implementations, however, have seen rapid change in recent years. In particular, advances in network architectures have changed application development significantly.

Like all computer programs, workflow applications and decision support systems may be stand-alone programs or part of a tiered-architecture. In general, a tiered-architecture includes multiple tiers (or "layers") of software that provide a different layer of service at varying levels of detail to the tiers above and beneath them. For years, many applications were designed to run in a two-tier architecture, referred to commonly as a "client-server architecture." The functionality of such an application generally was divided between a "client" program and a "server" program. The client program generally provided a user interface and implemented most of the application's logic (commonly referred to in an enterprise context as "business logic"). The server program, on the other hand, provided centralized access to data, so that multiple clients could access the data through a single server. In recent years, though, this traditional two-tier client/server system has been displaced slowly by more sophisticated multi-tier systems. In general, a multi-tier system places at least one intermediate component between the client and the server. These components are referred to commonly as "middleware." Today, programmers often implement an application's logic in middleware programs, rather than in a traditional client program.

Tools for developing workflow applications and decision support systems generally have been designed for traditional, two-tier client-server architectures, or even for monolithic (single-tier) architectures. Tools for developing multi-tier workflow applications are far less common, and existing tools do not provide an effective means for integrating a decision support system into a workflow application. The invention described in detail below addresses the need in the art for such a means.

This and other objects of the invention will be apparent to those skilled in the art from the following detailed description of a preferred embodiment of the invention.

SUMMARY OF THE INVENTION

The invention described below is a new and useful process, and appurtenant apparatus, for developing and using workflow applications with decision support. Specifically, the invention comprises a decision support engine and a programmatic interface thereto. The decision support engine is a middleware computer program that receives queries from a workflow application, connects to external data sources, executes queries, and returns query results to the workflow application. The programmatic interface allows an application developer to integrate business logic and queries into a workflow application that supports decision-making, and to implement decision support logic into the workflow application without implementing logic to access the data source.

BRIEF DESCRIPTION OF DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "Decision Support Engine (DSE)," which comprises smaller programming units that will be referred to as the "connection manager," "query manager," and "application program interface (API)."

Figure 1:
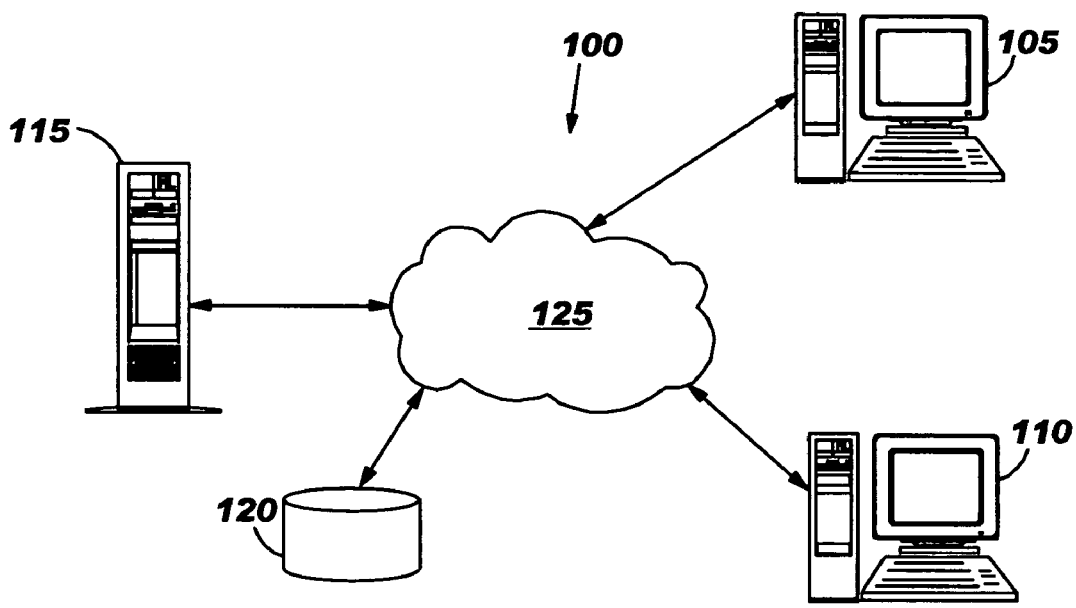
FIG. 1 represents an exemplary network of computers and other hardware devices, through which a Decision Support Engine may communicate with workflow applications and data sources.

Additionally, the DSE and its components will be described with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
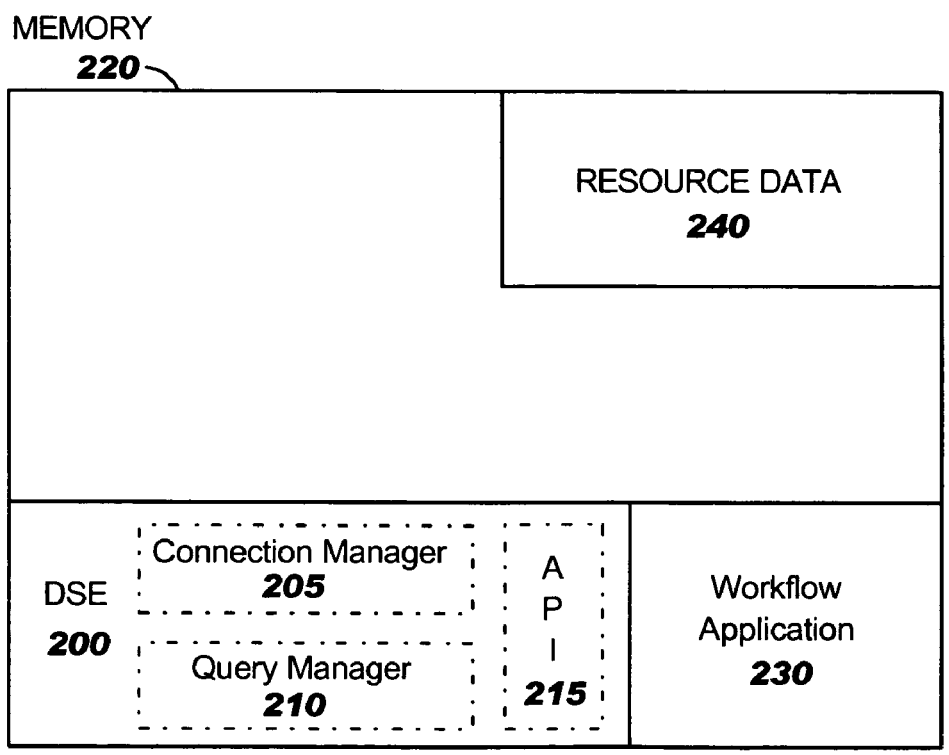
FIG. 2 is a schematic diagram of a Decision Support Engine, its components, and other resources.

DSE 200, including connection manager 205, query manager 210, and API 215, typically are stored in a memory, represented schematically as memory 220 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of media. Thus, FIG. 2 is included merely as a descriptive expedient and does not necessarily reflect any particular physical embodiment of memory 220. As depicted in FIG. 2, though, memory 220 may include additional data and programs. Of particular import to DSE 200, memory 220 may include workflow application 230, with which DSE 200 interacts. An "application," as used herein, includes without limitation any computer program, or any combination or aggregation of computer programs, designed to interact with an end-user, especially to implement business operations or rules. API 215 comprises a set of utility programs, methods, or objects that a developer can use to integrate DSE 200 functionality into workflow application 230. DSE 200 and workflow application 230 also may share common resource data 240.

Figure 3:
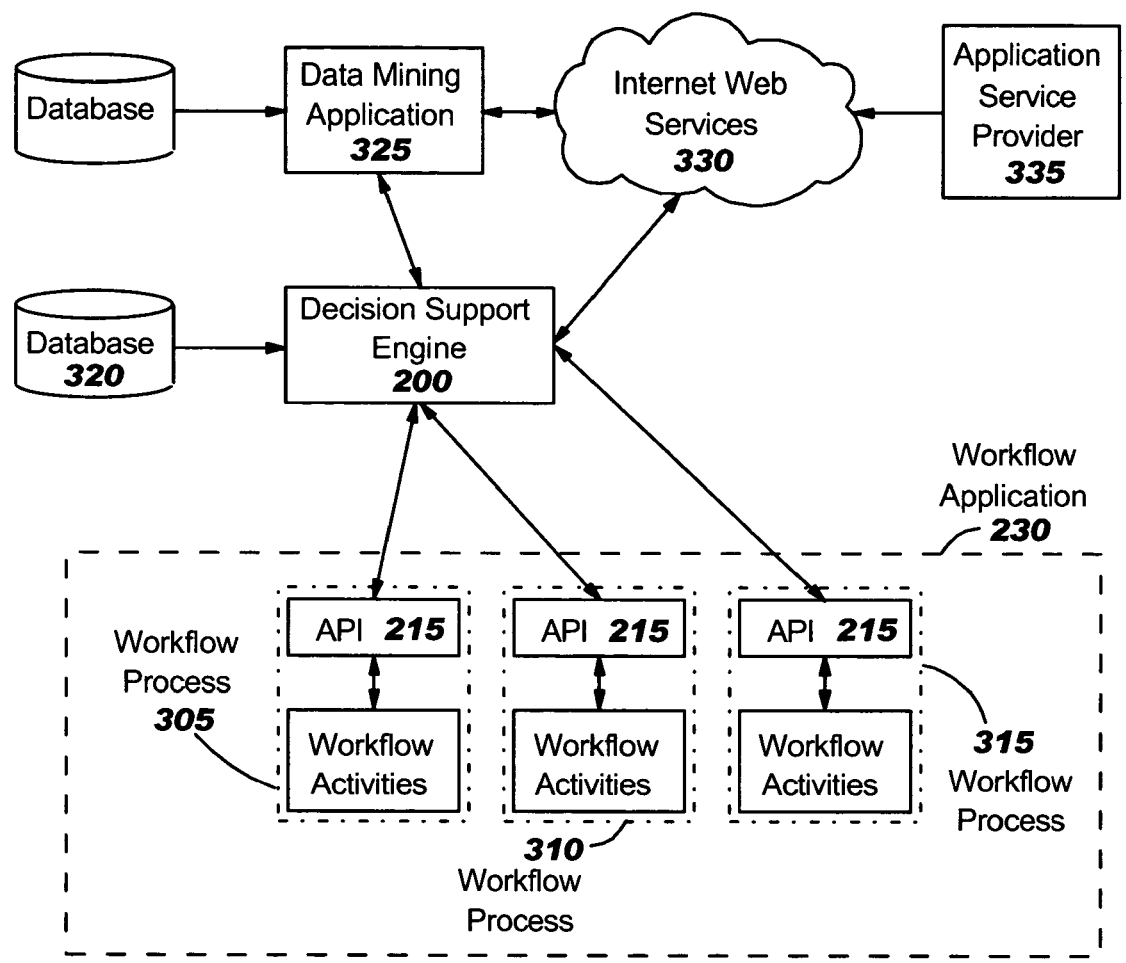
FIG. 3 depicts the interaction of a workflow application with a Decision Support Engine to provide decision support to a user of the workflow application.

FIG. 3 depicts the interaction of workflow application 230 with DSE 200 to provide decision support to a user of workflow application 230. Referring to FIG. 3 for illustration, DSE 200 services queries from workflow application 230. More specifically, DSE 200 services queries from workflow processes 305-315 within workflow application 230. Each workflow process 305-315 interfaces with DSE 200 through API 215. An application developer can use API 215 to specify one or more external data sources and submit a query to DSE 200. The term "data source" includes without limitation any medium used to store structured data or any computer program operable to retrieve data from such a structured data storage medium, such as a file, database, memory, data mining application, database server, or application server. In FIG. 3, database 320, data mining application 325, internet web services 330, and application service provider 335 all are exemplary data sources.

Figure 4:
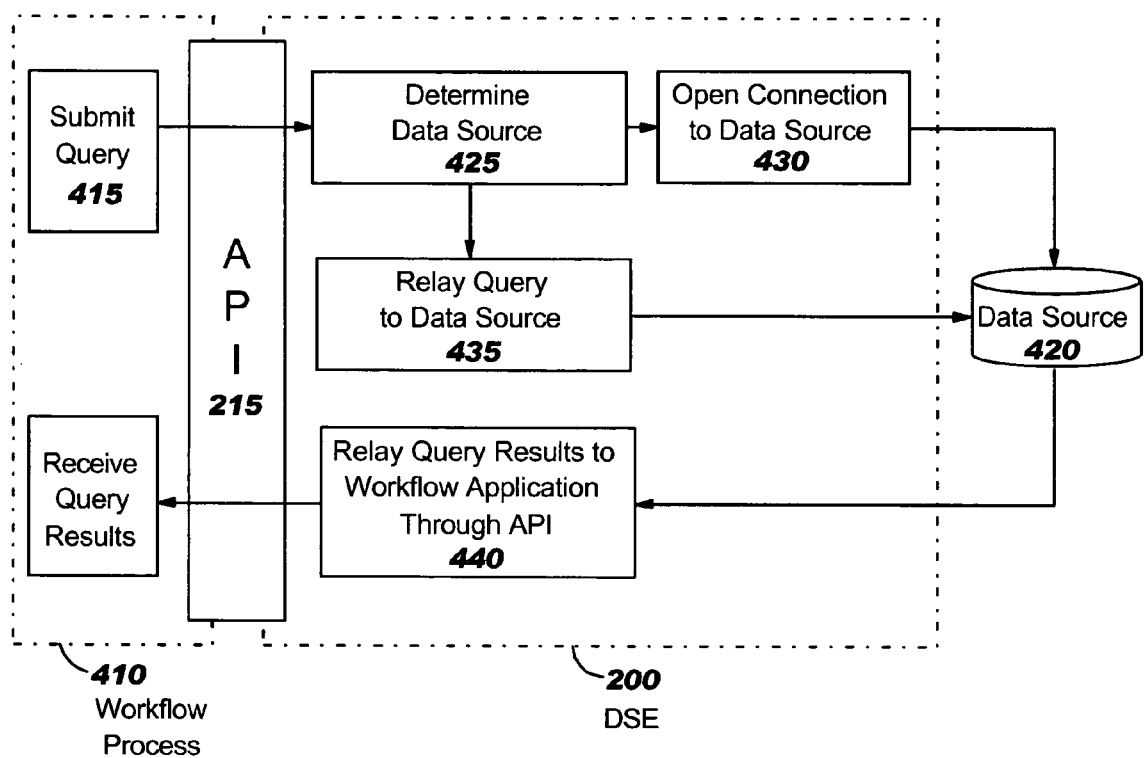
FIG. 4 provides a detailed illustration of the interaction between a workflow process and a Decision Support Engine.

FIG. 4 provides a detailed illustration of the interaction between a workflow process and DSE 200. Workflow process 410, which may be any of the workflow processes 305-315 depicted in FIG. 3 and described above, submits a query, which also identifies one or more external data sources, to DSE 200 through API 215 (415). Query manager 210 receives the query and extracts the identity of each data source 420, which may include any of the data sources 320-335 depicted in FIG. 3 and described above (425). Connection manager 205 then opens a connection to each data source 420 (430). Query manager 210 next relays the query to each data source 420 (435), which processes the query and returns the results to query manager 210. Finally, query manager 210 relays the results to workflow process 410 through API 215 (440).

A preferred form of the invention has been shown in the drawings and described above, but variations in the preferred form will be apparent to those skilled in the art. The preceding description is for illustration purposes only, and the invention should not be construed as limited to the specific form show and described. The scope of the invention should be limited only by the language of the following claims.

What is claimed is:

1. A process for providing decision support to a user of a workflow application, the process comprising:

using the workflow application stored in a memory connected to a computer, causing a processor of the computer to coordinate a plurality of workflow processes within the workflow application;

using an application program interface from a plurality of application program interfaces, connecting a decision support engine to the plurality of workflow processes within the workflow application and to a plurality of external data sources;

at a workflow process within the workflow application, sending a query that identifies an external data source within the plurality of external data sources;

using a query manager of the decision support engine, receiving the query;

using the query manager of the decision support engine, extracting from the query an identity of the external data source;

using a connection manager of the decision support engine, opening a connection to the external data source;

using the query manager of the decision support engine, transmitting the query to the external data source;

using the query manager of the decision support engine, receiving a query result from the external data source; and using the query manager of the decision support engine, providing the query result to the workflow application, wherein the plurality of external data sources are logically connected to the workflow application only through the decision support engine, wherein the application program interface includes a set of utility programs, methods or objects used by an application developer to integrate a functionality of the decision support engine into the workflow application so that the decision support engine services a plurality of queries that support decision making from the plurality of workflow processes, wherein each workflow process of the plurality of workflow processes interfaces with the decision support engine through a corresponding application program interface to specify at least one external data source and to submit at least one query to the decision support engine, wherein a data source is any medium used to store structured data or any computer program to retrieve data from a structured data storage medium including a file, a database, a data mining application, an internet web service and an application service provider, wherein the workflow application uses the application program interface to implement decision support logic, and wherein the application developer implements the decision support logic into the workflow application without implementing logic to access the data source.

* * * * *